(12) United States Patent
Andriamagnevalonaky et al.

(10) Patent No.: US 11,608,086 B2
(45) Date of Patent: Mar. 21, 2023

(54) DISPLAY DEVICE OF VEHICLE

(71) Applicant: TOYOTA JIDOSHA KABUSHIKI KAISHA, Toyota (JP)

(72) Inventors: Arei Rodelys Andriamagnevalonaky, Nishitokyo (JP); Paula Kusinska, Tokyo-to (JP); Lorcan O'Shanahan, Vancouver (CA); Shang-Poh Yu, Tokyo-to (JP); Sabrina Hyewon Lee, Tokyo-to (JP); Matthew Doell, Tokyo-to (JP); Thor Lewis, Sunnyvale, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 17/078,566

(22) Filed: Oct. 23, 2020

(65) Prior Publication Data

US 2021/0122397 A1    Apr. 29, 2021

(30) Foreign Application Priority Data

Oct. 23, 2019   (JP) .............................. JP2019-193004

(51) Int. Cl.
*B60W 60/00* (2020.01)
*B60Q 3/54* (2017.01)
(Continued)

(52) U.S. Cl.
CPC ..... *B60W 60/0053* (2020.02); *B60H 1/00985* (2013.01); *B60K 35/00* (2013.01); *B60Q 3/12* (2017.02); *B60Q 3/16* (2017.02); *B60Q 3/54* (2017.02); *B60Q 3/70* (2017.02); *B60W 50/14* (2013.01); *G05D 1/0061* (2013.01);
(Continued)

(58) Field of Classification Search
None
See application file for complete search history.

(56) References Cited

U.S. PATENT DOCUMENTS

2010/0295670 A1    11/2010   Sato et al.
2013/0176335 A1     7/2013   Sugiyama et al.
(Continued)

FOREIGN PATENT DOCUMENTS

JP    2008-195375 A    8/2008
JP    2012-056335 A    3/2012
(Continued)

*Primary Examiner* — James J Lee
*Assistant Examiner* — Andrew Sang Kim
(74) *Attorney, Agent, or Firm* — Oliff PLC

(57) ABSTRACT

A display device of a vehicle includes: a display provided inside of the vehicle; an interior lighting device lighting up an inside surface of a passenger compartment of the vehicle at an outside of the display; and a control device controlling the display and the interior lighting device. The control device is configured so that when a condition for moving display stands, the display is made to show a moving display element moving toward an outer circumference of the display, and so that when the moving display element reaches the outer circumference of the display, the interior lighting device lights up an inside surface of a passenger compartment of the vehicle so that a light part lit by the interior lighting device appears to move successively from the moving display element.

12 Claims, 15 Drawing Sheets

(51) Int. Cl.
    *B60K 35/00*     (2006.01)
    *G05D 1/00*     (2006.01)
    *B60Q 3/70*     (2017.01)
    *B60H 1/00*     (2006.01)
    *B60W 50/14*     (2020.01)
    *B60Q 3/16*     (2017.01)
    *B60Q 3/12*     (2017.01)

(52) U.S. Cl.
    CPC .... *B60K 2370/161* (2019.05); *B60Q 2400/10* (2013.01); *B60Q 2400/20* (2013.01); *B60W 2050/146* (2013.01)

(56) References Cited

U.S. PATENT DOCUMENTS

| | | |
|---|---|---|
| 2017/0106786 A1* | 4/2017 | Ebina .................... G08B 5/36 |
| 2019/0004514 A1 | 1/2019 | Hiwatashi et al. |
| 2019/0283770 A1 | 9/2019 | Kubota et al. |
| 2020/0298881 A1 | 9/2020 | Odate et al. |

FOREIGN PATENT DOCUMENTS

| | | |
|---|---|---|
| JP | 2019-010929 A | 1/2019 |
| JP | 2019-156265 A | 9/2019 |
| WO | 2017/168540 A1 | 10/2017 |

\* cited by examiner

DISPLAY DEVICE OF VEHICLE

FIELD

The present disclosure relates to a display device of a vehicle.

BACKGROUND

Known in the art is a display device of a vehicle which provides a display at a vehicle and has that display show operations which a driver should perform, etc. As such a display device, for example, one which is used in a vehicle able to switch a driving state between autonomous driving and manual driving has been studied (for example, PTL 1). In this display device, a guidance screen guiding a driver to grip a steering wheel is shown on the display before the driving state is switched from autonomous driving to manual driving.

CITATIONS LIST

Patent Literature

[PTL 1] Japanese Unexamined Patent Publication No. 2019-010929

SUMMARY

In this regard, the space in a vehicle is limited, therefore there are limits to the size and installation location of a display able to be used in the vehicle. Therefore, for example, the display is installed in a distance away from the steering wheel. As a result, as explained above, even if making the display show a guidance screen, since the display on which instructions for operation are shown and the steering wheel which is operated are separated from each other, sometimes the driver cannot intuitively understand what is to be operated. In particular, it is difficult to determine what is to be operated, when the display is showing various operations to be performed on various objects. In other words, due to the limitations on the size and installation location of the display, sometimes information shown on the display cannot be intuitively understood by the occupants.

In consideration of this problem, an object of the present disclosure is to provide a display device of a vehicle designed to enable an occupant to intuitively understand information shown on a display.

The present invention has as its gist the following.

(1) A display device of a vehicle comprising:
a display provided inside of the vehicle;
an interior lighting device lighting up an inside surface of a passenger compartment of the vehicle at an outside of the display; and
a control device controlling the display and the interior lighting device,
wherein the control device is configured so that when a condition for moving display stands, the display is made to show a moving display element moving toward an outer circumference of the display, and so that when the moving display element reaches the outer circumference of the display, the interior lighting device lights up an inside surface of a passenger compartment of the vehicle so that a light part lit by the interior lighting device appears to move successively from the moving display element.

(2) The display device of the vehicle according to above (1), wherein the interior lighting device includes a light emitting device embedded at the interior of the vehicle and emitting light on its own.

(3) The display device of the vehicle according to above (1) or (2), wherein the interior lighting device includes a light beam device beaming light on an inside surface at the interior of the vehicle.

(4) The display device of the vehicle according to any one of above (1) to (3), wherein the condition for moving display stands when it is necessary to make an occupant of the vehicle to perform an operation with respect to the vehicle.

(5) The display device of the vehicle according to above (4), wherein
the control device makes the display show the operation which the occupant of the vehicle has to perform, when the condition for moving display stands, and
the moving display element moves from a display element showing the required operation toward the outside of the display.

(6) The display device of the vehicle according to above (4) or (5), wherein
the interior lighting device is configured so that the light part moves from the area around the display to an operating part for operating the vehicle, and
the condition for moving display stands when it is necessary to make a driver of the vehicle to operate the operating part.

(7) The display device of the vehicle according to above (6), wherein
the operating part is a steering wheel of the vehicle,
the vehicle is configured to be able to be driven in an autonomous driving mode where the vehicle is automatically steered even without the driver operating the steering wheel and a manual driving mode where the vehicle is steered by the driver operating the steering wheel, and
the condition for moving display stands when it is necessary to make the driver to grip the steering wheel so as to switch the driving mode of the vehicle from the autonomous driving mode to the manual driving mode.

(8) The display device of the vehicle according to any one of above (1) to (7), wherein the condition for moving display stands when the state of the vehicle automatically changes without an occupant of the vehicle performing a direct operation.

(9) The display device of the vehicle according to above (8), wherein
the control device makes the display show a display element expressing a change in state of the vehicle when the condition for moving display stands, and
the moving display element moves from the display element expressing a change toward an outside of the display.

(10) The display device of the vehicle according to above (8) or (9), wherein the interior lighting device is configured so that the light part moves in a front-back direction by a plurality of different routes.

(11) The display device of the vehicle according to any one of above (8) to (10), wherein
the condition for moving display stands when an operating state of an air-conditioner of the vehicle changes, and
the control device is configured so that the light part lit by the interior lighting device changes color according to the operating state of the air-conditioner of the vehicle.

Advantageous Effects of Invention

According to the present disclosure, a display device of a vehicle designed to enable an occupant to intuitively determine information shown on a display is provided.

DESCRIPTION OF EMBODIMENTS

Figure 1:
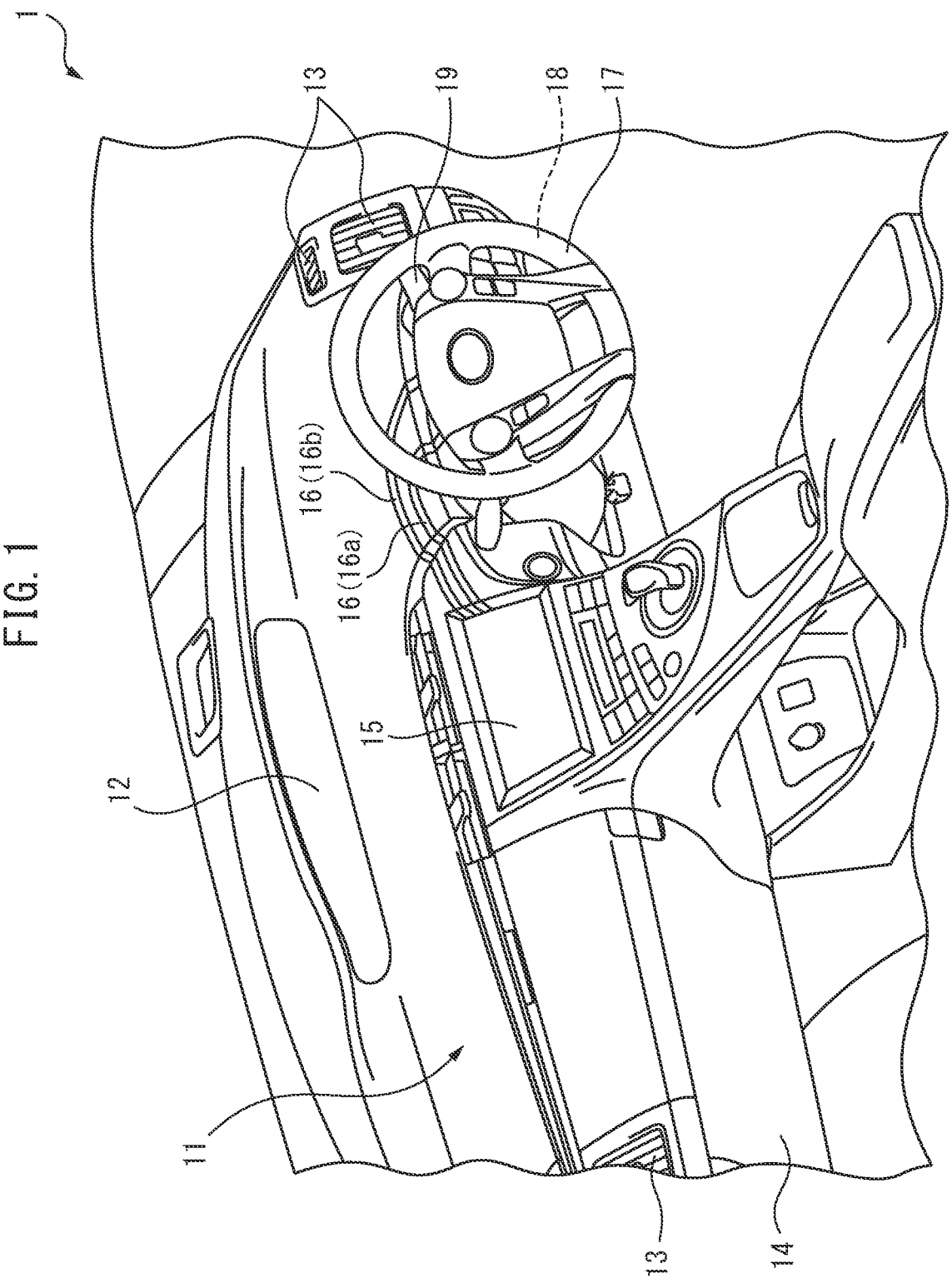
FIG. 1 is a view schematically showing an area around a driver's seat of a vehicle.

Below, referring to the drawings, embodiments will be explained in detail. Note that, in the following explanation, similar elements will be assigned the same reference notations.

First Embodiment

Configuration of Vehicle

Referring to FIG. 1, the configuration of a vehicle 1 at which a display device according to the present embodiment is provided will be explained. FIG. 1 is a view schematically showing an area around a driver's seat of the vehicle 1.

As shown in FIG. 1, the vehicle 1 is provided with an instrument panel 11 at the front of a passenger compartment. The instrument panel 11 is provided with a meter panel 12 on which information relating to operation of the vehicle is displayed, vents 13 venting air adjusted in temperature by the air-conditioner, a glove compartment 14 functioning as a storage space, etc.

Further, the vehicle 1 is provided with a display 15 provided in the passenger compartment, embedded lights 16, a steering wheel 17, a touch sensor 18, and a light switch 19.

The display 15 is a device making a screen light up to display an image. As the display 15, a liquid crystal display, organic EL display, or other various displays can be used. The display 15 may be provided with a touch panel which an occupant can touch to input an operation.

The display 15 is embedded in the wall of passenger compartment of the vehicle 1 so that an occupant of the vehicle 1 can view the screen. In the present embodiment, the display 15 is embedded in an instrument panel 11 provided at the front of the passenger compartment. In particular, in the example shown in FIG. 1, the display 15 is embedded at the center of the instrument panel 11 (between the driver's seat and the navigator's seat) at a height of the same extent as the steering wheel 17 of the vehicle 1. However, the display 15 may also be provided at another location so long as inside the passenger compartment of the vehicle 1 and able to be viewed by an occupant.

The embedded lights 16 are one example of interior lighting devices lighting up an inside surface of the passenger compartment of the vehicle 1 at the outside of the display 15. In the present embodiment, the embedded lights 16 extend in lines inside the passenger compartment of the vehicle 1, in particular, in the instrument panel 11. In the example shown in FIG. 1, the vehicle 1 is provided with two embedded lights 16a and 16b. One end of each of the embedded lights 16 is positioned adjoining an outer circumference of the display 15. The other end of each of the embedded lights 16 is positioned near an operating part for operating the vehicle 1. The operating parts for operating the vehicle 1 include, in addition to the steering wheel and accelerator pedal for controlling operation of the vehicle 1, operating switches of the air-conditioner for controlling the state of the inside of the passenger compartment of the vehicle 1 and operating switches of the audio in the vehicle, etc. In the present embodiment, the other end of the first embedded light 16a is positioned near the steering wheel 17. The other end of the second embedded light 16b is positioned near the light switch 19.

Note that, in the present embodiment, the embedded lights 16 are embedded in the instrument panel 11, but they may also be embedded in members forming the passenger compartment other than the instrument panel 11. However, in this case as well, one end of each of the embedded lights 16 is positioned at the outer circumference of the display 15. Further, just one embedded light 16 or three or more lights may also be provided. Further, the embedded lights 16 do not necessarily have to be embedded in the instrument panel 11. They may also be attached to the instrument panel 11.

The embedded lights 16 are configured to emit light themselves, and are arranged to be able to be viewed by an occupant when emitting light. The embedded lights 16 are configured by a plurality of lights able to be individually turned on and turned off. In particular, in the present embodiment, they are comprised of pluralities of LEDs able to emit light on their own. Therefore, in the linearly extending embedded lights 16, any part of the embedded lights 16 can emit light at any timing. For this reason, the embedded lights 16 can be controlled to light up to make it appear as if the lit up light parts were moving by successively turn on the lights from one end to the other end. In other words, the embedded lights 16 are configured to be able to move the lighting parts from around the display 15 to operating parts for operating the vehicle. Note that, the embedded lights 16 may also be light emitting devices other than LED lights so long as able to emit light on their own.

The steering wheel 17 is used as an operating part for steering the vehicle 1. The steering wheel 17 is configured to steer the vehicle 1 in accordance with operation by the driver. As shown in FIG. 1, the steering wheel 17 is connected to the instrument panel 11 and arranged toward the back side of the vehicle 1 from the instrument panel 11.

The touch sensor 18 is provided over the entire length of the outer circumference of the steering wheel 17. The touch sensor 18 is used to detect if the driver is touching the steering wheel 17.

The light switch 19 is used as an operating part for switching the on/off state of the headlights. In the present embodiment, the light switch 19 is arranged at a lever extending from near the attachment part of the steering wheel 17. The light switch 19 is designed to be able to switch among a state turning off the headlights and position lights (off mode), a state turning on the position lights (position mode), a state turning on the headlights (on mode), and a state automatically turning on and turning off the lights (auto mode). Note that the light switch 19 may, for example, also be provided at a position other than the above-mentioned lever, such as on the instrument panel 11.

Figure 2:
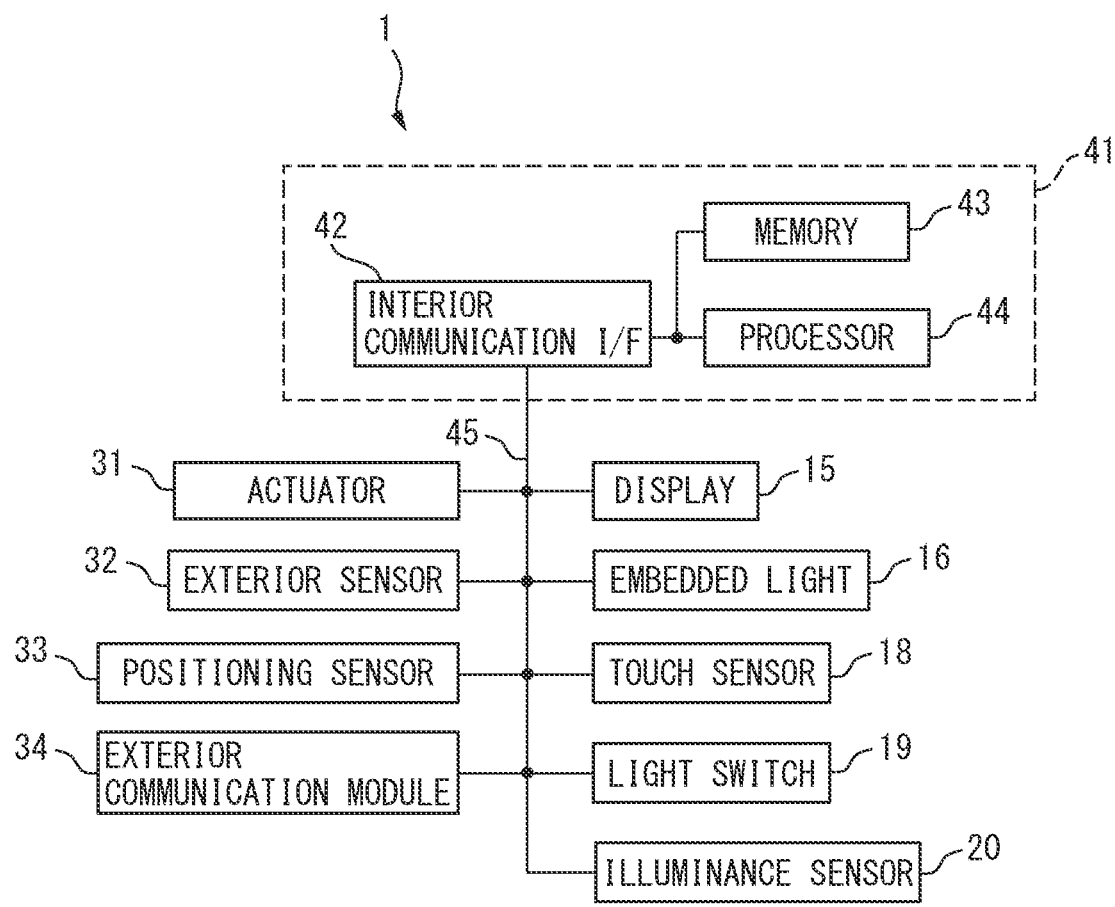
FIG. 2 is a view schematically showing a configuration of a vehicle.

Next, referring to FIG. 2, the configuration of the vehicle 1 will be explained. Part of the vehicle 1 functions as the display device of the vehicle 1. FIG. 2 is a view schematically showing the configuration of the vehicle 1.

As shown in FIG. 2, the vehicle 1 is provided with an electronic control unit (ECU) 41. The ECU 41 functions as a control device of the vehicle 1 and functions as the control device in the display device. The ECU 41 has an internal communication interface 42, memory 43, and processor 44. The internal communication interface 42 and the memory 43 are connected to the processor 44 through signal lines. Note that, in the present embodiment, the vehicle 1 is provided with only one ECU 41, but it may also be provided with a plurality of ECUs for the individual functions.

The internal communication interface 42 has an interface circuit for connecting the ECU 41 to an internal network 45 based on the CAN (controller area network) or other standard. The ECU 41 communicates with other vehicle-mounted equipment through the internal communication interface 42.

The memory 43 functions as a storage part for storing data. The memory 43, for example, has a volatile semiconductor memory (for example, RAM) and nonvolatile semiconductor memory (for example, ROM). The memory 43 stores computer programs for executing various types of processing at the processor 44, various types of data used when the processor 44 executes the various types of processing, etc.

The processor 44 has one or more CPUs (central processing units) and their peripheral circuits. The processor 44 may also further have a GPU (graphics processing unit), or a processing circuit such as an arithmetic logic unit or numerical processing unit. The processor 44 executes various types of processing based on computer programs stored in the memory 43.

Further, as shown in FIG. 1, the vehicle 1 is provided with a display 15, embedded lights 16, touch sensor 18, light switch 19, and illuminance sensor 20. These display 15, embedded lights 16, touch sensor 18, light switch 19, and illuminance sensor 20 are connected through the internal network 45 to the internal communication interface 42 of the ECU 41. Further, the display 15, embedded lights 16, touch sensor 18, light switch 19, and illuminance sensor 20 configure the display device of the vehicle 1.

The illuminance sensor 20 detects the brightness outside of the vehicle 1. The illuminance sensor 20, for example, is provided on an upper part of the center of the front window of the vehicle 1 near the back side of the back mirror.

The display 15 and the embedded lights 16 are controlled by output signals from the ECU 41. Therefore, the ECU 41 functions as the control device controlling the display 15 and embedded lights 16. On the other hand, the output signals of the touch sensor 18, light switch 19, and illuminance sensor 20 are input to the ECU 41.

Further, the vehicle 1 is further provided with actuators 31, an external sensor 32, positioning sensor 33, and external communication module 34.

The actuators 31 include a plurality of actuators for operating the vehicle 1. Specifically, the actuators 31 include a drive device for driving the vehicle 1 (for example, at least one of an internal combustion engine and motor), a steering device for steering the vehicle 1 (for example, a steering motor), and a braking device for braking the vehicle 1 (for example, a braking actuator). These actuators 31 are connected through the internal network 45 to the ECU 41 and are operated in accordance with drive signals from the ECU 41.

The external sensor 32 is a sensor for detecting information on the surroundings of the vehicle 1. The information on the surroundings include information on other vehicles being driven or stopped around the vehicle 1. In addition, the information on the surroundings include white lines of the roads, pedestrians, bicycles, buildings, signs, traffic lights, obstacles, and other information. The external sensor 32, for example, includes an external camera, milliwave radar, LIDAR (laser imaging detection and ranging), ultrasonic wave sensor, etc. Among these, the external camera captures an image of the surroundings of the vehicle. The external sensor 32 is connected through the internal network 45 to the ECU 41, and transmits detected information on the surroundings of the vehicle 1 to the ECU 41.

The positioning sensor 33 is a sensor for detecting the current position of the vehicle 1. The positioning sensor 33, for example, is a GPS (global positioning system) which receives signals from three or more GPS satellites to detect the current position of the vehicle 1 (for example, the latitude and longitude of the vehicle 1). The positioning sensor 33 is connected through the internal network 45 to the ECU 41, and transmits the detected current position information of the vehicle 1 to the ECU 41.

The external communication module 34 forms a communication part communicating with external equipment. The external communication module 34 is, for example, a device for wireless communication with an external server, other vehicle, or mobile terminal, etc. The external communication module 34, for example, includes a data communication module (DCM), and short distance wireless communication module (for example, WiFi module or Bluetooth® module). The data communication module communicates through a wireless base station 5 and communication network 4 with a server 3. The short distance wireless communication module directly communicates with a mobile terminal.

Driving Modes of Vehicle

The driving modes of the vehicle 1 configured in this way will be briefly explained. The vehicle 1 according to the present embodiment can be driven by two driving modes of the autonomous driving mode and manual driving mode.

In the autonomous driving mode, the vehicle 1 is automatically driven even if the operating parts for controlling driving of the vehicle 1 are not operated by the driver. Therefore, in the autonomous driving mode, the vehicle 1 is automatically steered even if the driver does not operate the steering wheel 17.

In the autonomous driving mode, the ECU 41 estimates the accurate current position of the vehicle 1, based on the current position of the vehicle 1 detected by the positioning sensor 33, information on the surroundings of the vehicle 1 detected by the external sensor 32, and the map stored by the memory 43. The map stored in the memory 43 is acquired by the external communication module 34 from an external server by communication.

In addition, the ECU 41 detects other vehicles or persons driving through, stopped at, or walking through the surroundings of the vehicle 1, based on the information of the surroundings detected by the external sensor 32. Further, the ECU 41 prepares a driving plan for the vehicle 1 up to several seconds in the future, based on the estimated accurate current position and the position, speed, etc., of other vehicles, etc., around the vehicle 1. This driving plan includes the steering plan and acceleration/deceleration plan up to several seconds in the future.

After that, the ECU 41 controls the actuators in accordance with a prepared driving plan. Specifically, it controls the steering device in accordance with a steering plan, and controls the drive device and braking device in accordance with an acceleration/deceleration plan.

On the other hand, in the manual driving mode, the vehicle 1 is driven by the driver operating the operating parts. Therefore, in the manual driving mode, the vehicle 1 is steered by the driver operating the steering wheel.

Operation at Display Device (Hands on Demand)

In this regard, in the vehicle 1 of the present embodiment, the regions or situation where the vehicle 1 can be driven in the autonomous driving mode are limited. For example, the vehicle 1 cannot be driven in the autonomous driving mode in regions for which no map is prepared. Further, for example, the vehicle 1 cannot be driven in the autonomous driving mode when the field of vision is extremely poor and the external sensor 32 cannot suitably detect the information on the surroundings.

Here, if, when the vehicle 1 is being driven by the autonomous driving mode, it is anticipated that the vehicle 1 will reach a region or situation where it cannot be driven in the autonomous driving mode (below, referred to as the "autonomous driving disabled state", the driving mode of the vehicle 1 is switched from the autonomous driving mode to the manual driving mode. That is, in such a case, the driver has to operate the vehicle 1. At this time, if the driving mode of the vehicle 1 is suddenly switched from the autonomous driving mode to the manual driving mode, the driver cannot cope with the sudden changes in driving. Therefore, in the present embodiment, when the driving mode of the vehicle 1 is switched from the autonomous driving mode to the manual driving mode, notification control is performed to notify the driver that he or she has to operate the vehicle 1. Specifically, in the present embodiment, notification control for notifying the driver of a hands on demand demanding that he or she grip the steering wheel, is performed by the ECU 41.

Specifically, in notification control, if, when the vehicle 1 is being driven by the autonomous driving mode, the autonomous driving disabled state is reached, first the display 15 shows a display element showing the operation required by the driver. In the present embodiment, the display 15 shows an image X1 expressing a hands on demand to the driver.

Figure 3:
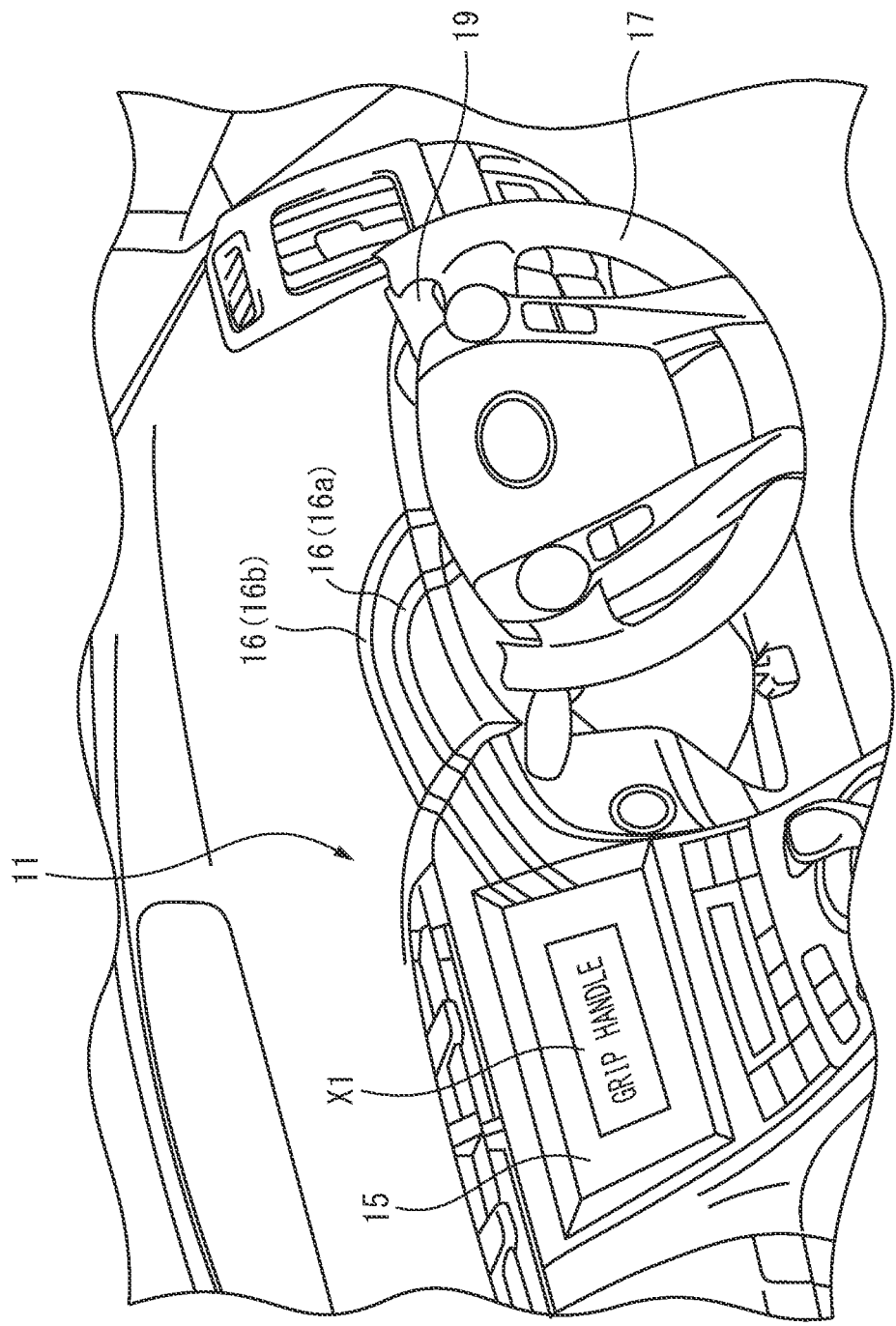
FIG. 3 is a view schematically showing an area around a driver's seat of a vehicle.

FIG. 3 is a view schematically showing the area around the driver's seat of the vehicle 1 in the state where the center of the display 15 shows the image X1 expressing a hands on demand. In FIG. 3, part of the steering wheel 17 is omitted. In the example shown in FIG. 3, as the image X1 expressing the hands on demand, the text "grip the handle" is shown at the center of the display 15. Note that, the image expressing the hands on demand may be, for example, a schematic graphic expressing the state of the handle being gripped by the hands or other image other than text.

Note that, if, when the vehicle 1 is being driven by the autonomous driving mode, the autonomous driving disabled state is reached, a sound prompting the driver to grip the steering wheel 17 (voice or warning sound), etc., may be issued from the speakers of the vehicle 1 (not shown), etc., as well as the display 15 shows the image X1 expressing a hands on demand.

Figure 4:
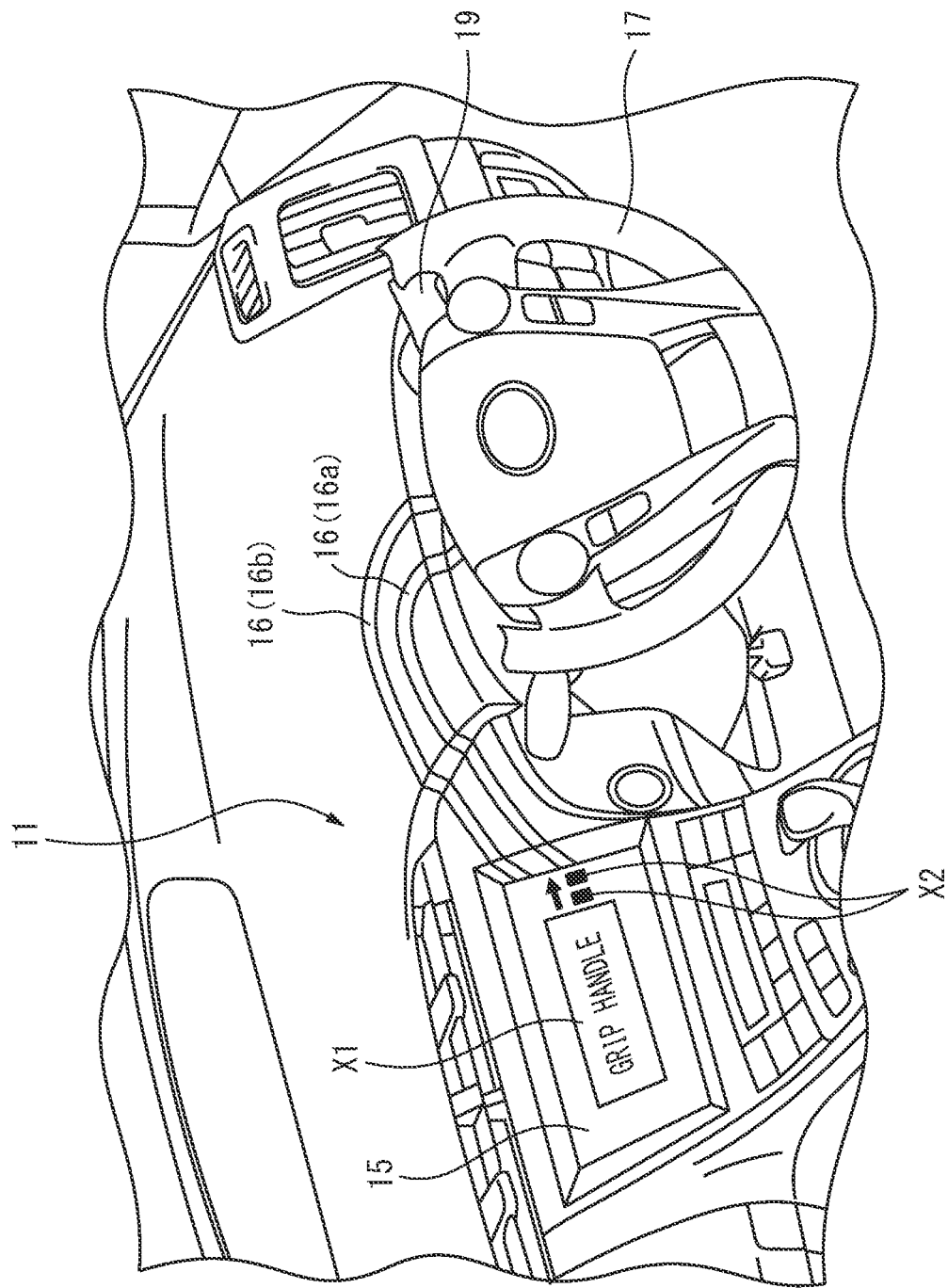
FIG. 4 is a view, similar to FIG. 3, schematically showing an area around a driver's seat of a vehicle.

After that, in the present embodiment, in the notification control, the display 15 shows a moving display element X2 moving from the image X1 expressing a hands on demand toward the outer circumference of the moving display 15. FIG. 4 is a view schematically showing the area around the driver's seat of the vehicle 1 in the state where the moving display element X2 moving from the center of the display 15 toward the outer circumference is shown on the display 15. In the example shown in FIG. 4, a square shaped moving display element X2 moves from the image X1 expressing a hands on demand toward the end of the display 15 side of the first embedded light 16a (in direction shown by arrow in FIG. 4). In the illustrated example, a second moving display element X2 separated from the initial moving display element X2 by a predetermined interval is displayed. The second moving display element X2 also moves by a speed the same as the speed of the initial moving display element X2.

Note that, in the present embodiment, along with movement from the initial moving display element X2, the moving display elements X2 shown on the display 15 are increased up to a certain number (even three or more), and move at certain intervals. However, the display 15 may also display just one moving display element X2. In this case, after one moving display element X2 reaches the outer circumference of the display 15 and disappears, the next moving display element X2 is newly displayed near the image X1 expressing the hands on demand, and moves toward the outer circumference. Alternatively, a plurality of moving display elements X2 may be displayed so as to move in a line from when starting display of the moving display elements X2.

A moving display element X2 shown on the display 15 disappears when reaching the outer circumference of the display 15. Further, if the moving display element X2 disappears at the outer circumference of the display 15, along with this, the light positioned at the end of the first embedded light 16a at the display 15 side is turned on.

Figure 5:
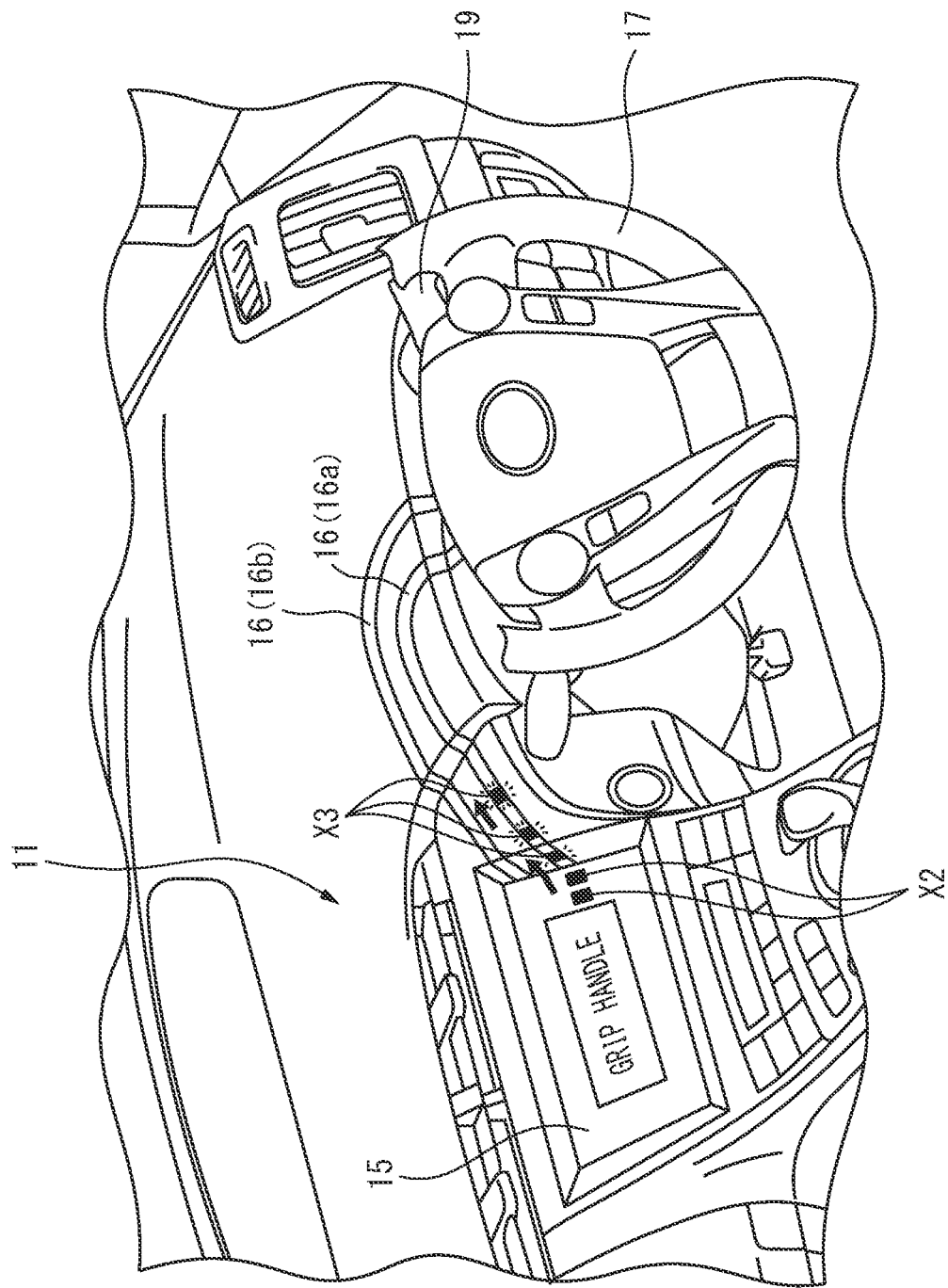
FIG. 5 is a view, similar to FIG. 3, schematically showing an area around a driver's seat of a vehicle.

FIG. 5 is a view schematically showing the area around the driver's seat of the vehicle 1 after the light positioned at the end of the first embedded light 16a at the display 15 side is turned on. As shown in FIG. 5, if the light positioned at one end of the first embedded light 16a is turned on, the adjoining lights of the first embedded light 16a are successively turned on then turned off so that the light part X3 formed by light emission moves toward the other end (in direction shown by arrow mark in FIG. 5). As shown in FIG. 5, at the first embedded light 16a of the present embodiment, the light part X3 formed due to light emission moves toward the steering wheel 17 by a speed of movement equivalent to the speed of movement of the moving display element X2.

Figure 6:
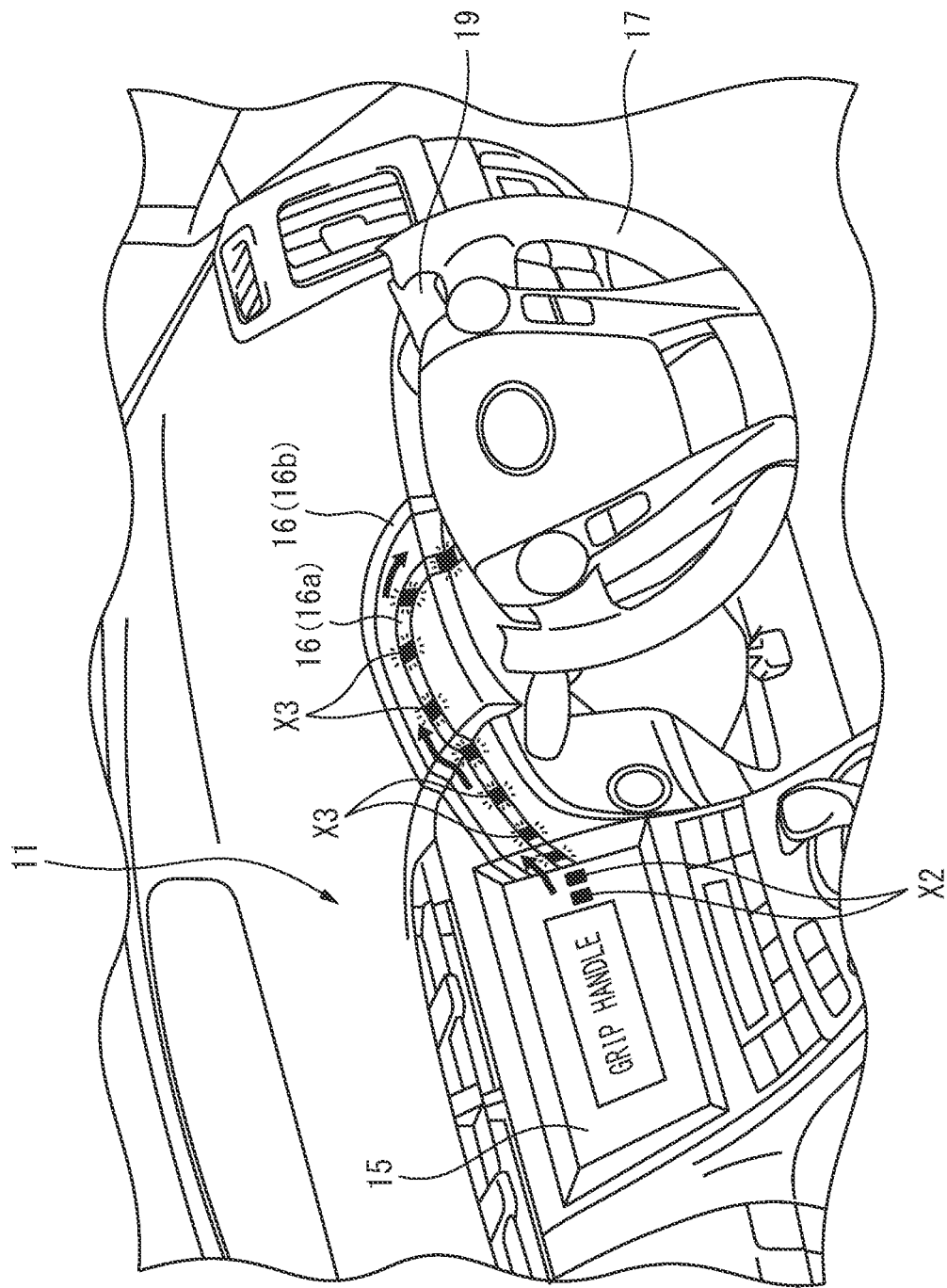
FIG. 6 is a view, similar to FIG. 3, schematically showing an area around a driver's seat of a vehicle.

FIG. 6 is a view schematically showing the area around the driver's seat of the vehicle 1 in the state where a plurality of light parts X3 at the first embedded light 16a successively move toward the end at the steering wheel 17 side. As shown in FIG. 6, if the second and later moving display elements X2 disappear at the outer circumference of the display 15 after the first light part X3 moves toward the steering wheel 17, along with this, in the first embedded light 16a, the second and later light parts X3 are turned on and are moved toward the steering wheel 17 (to direction shown by arrow mark in FIG. 6). After that, these light parts X3 reach the end of the first embedded light 16a at the steering wheel 17 side, then disappear.

Note that, in the present embodiment, along with movement of the first light part X3, the light parts X3 turned on at the first embedded light 16a increase up to a certain number, and move at certain intervals. However, the first embedded light 16a may also emit light so that only one light part X3 is formed simultaneously. In this case, the one light part X3 reaches the end of the first embedded light 16a at the steering wheel 17 side then disappears, then the next light part X3 is turned on at the end of the display 15 side. Alternatively, the first embedded light 16a may be turned on so that a plurality of light parts X3 move in a line when starting light emission of the light parts X3.

Further, in the present embodiment, the display 15 shows an image X1 expressing a hands on demand, then displays the moving display element X2, then turns on the light part X3. However, the display of the image X1 expressing the hands on demand, the display of the moving display element X2, and the turning on of the light part X3 may be simultaneously started.

Operation of Display Device (Headlights on Demand)

Further, as explained above, the light switch 19 can switch among four states. Among these, if the light switch 19 is set to the light off mode, even if the surroundings of the vehicle 1 are dark, the headlights will not turn on. However, if the headlights are not turned on when the surroundings of the vehicle 1 are dark, sometimes the external sensor 32 will not be able to accurately detect the information on the surroundings (in particular, when an external camera is used as the external sensor 32). For this reason, if the headlights are not turned on in a state of dark surroundings of the vehicle 1, the precision of control of the autonomous driving in the autonomous driving mode will fall.

Therefore, in the present embodiment, when the driving mode of the vehicle 1 is the autonomous driving mode and the surroundings of the vehicle 1 are dark, the ECU 41 performs notification control notifying the driver of a light switching demand demanding he or she switch the light switch 19 to a state turning on the headlights (on mode or auto mode). The notification control providing notification of the light switching demand is performed in the same way as the notification control providing notification of a hands on demand.

Specifically, when the light switch 19 is set to the light off mode, if the external illuminance detected by the illuminance sensor 20 becomes a predetermined value or less, the display 15 shows an image X1' expressing a light switching demand.

Figure 7:
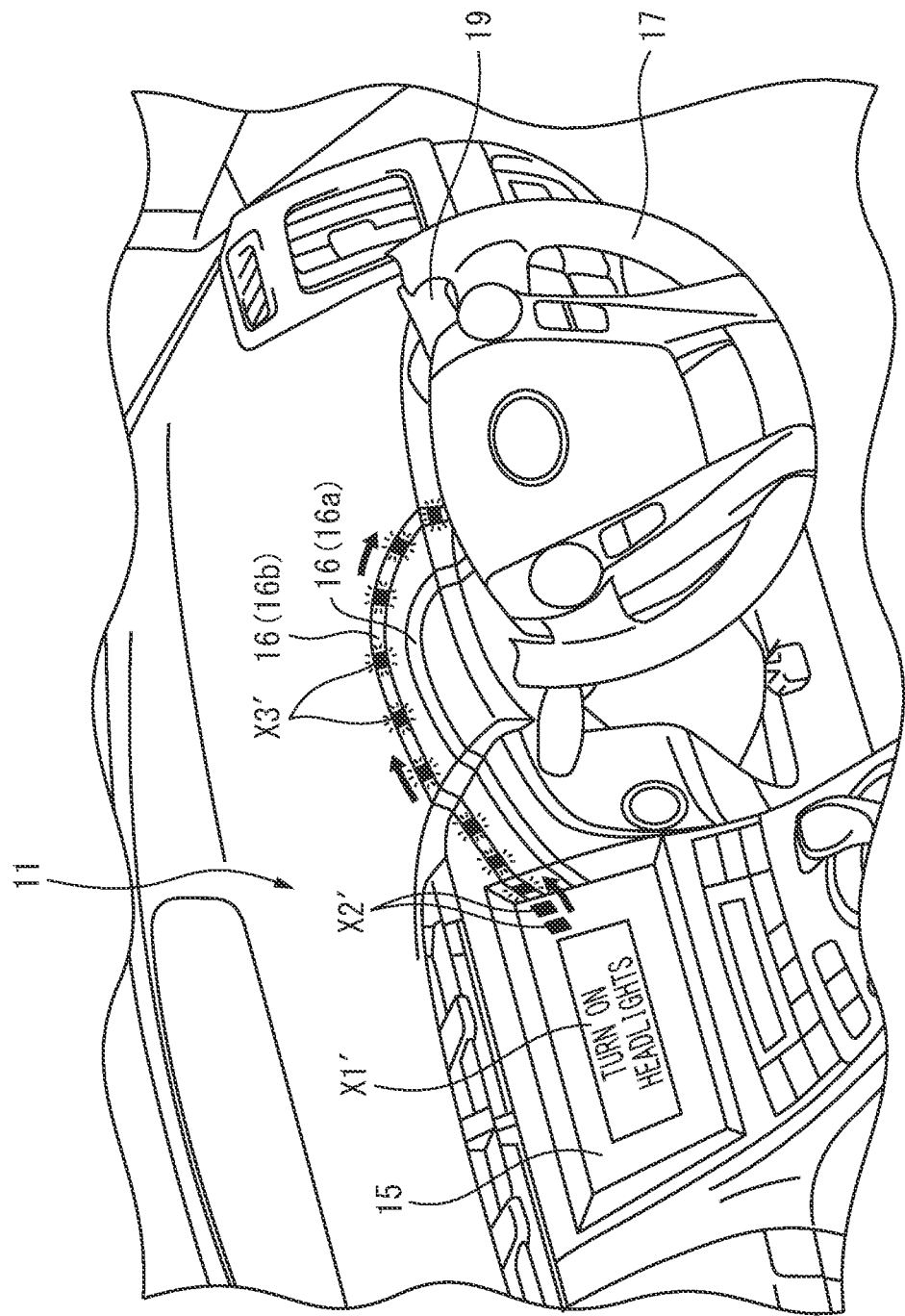
FIG. 7 is a view, similar to FIG. 3, schematically showing an area around a driver's seat of a vehicle.

After that, in the present embodiment, the display 15 shows a moving display element X2' moving from the image X1' expressing the light switching demand toward the outer circumference of the display 15. As shown in FIG. 7, the moving display element X2' moves from the image X1' expressing the light switching demand to the end of the second embedded light 16b at the display 15 side (in direction shown by arrow mark of FIG. 7).

A moving display element X2' shown on the display 15 disappears when reaching the outer circumference of the display 15. Further, if the moving display element X2' disappears at the outer circumference of the display 15 in this way, along with this, the light positioned at the end of the second embedded light 16b at the display 15 side is turned on.

If the light positioned at one end of the second embedded light 16b is turned on, the adjoining lights of the second embedded light 16b are successively turned on then turned off so that the light part X3' formed by the emission of light moves toward the other end (in direction shown by arrow mark in FIG. 7). Therefore, as shown in FIG. 7, at the second embedded light 16b, the light part X3' formed by emission of light moves toward the light switch 19 by a speed of movement equal to the speed of movement of the moving display element X2'.

Flow Chart

Figure 8:
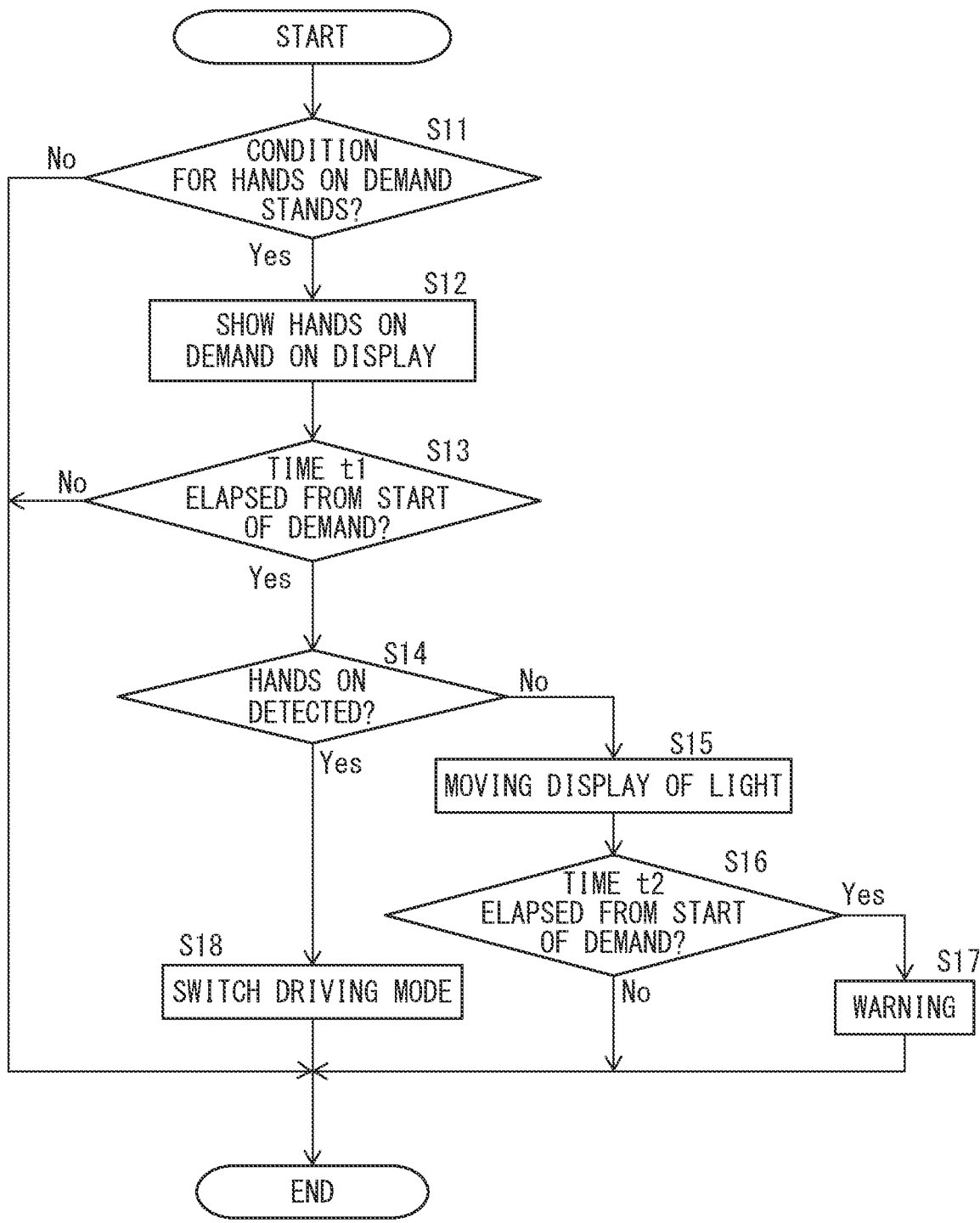
FIG. 8 is a flow chart showing a control routine of notification control for providing notification of a hands on request.

FIG. 8 is a flow chart showing a control routine of notification control providing notification of hands on demand. The illustrated control routine is executed every certain time interval.

First, at step S11, it is determined if the condition for demand for the hands on demand stands. The condition for demand of the hands on demand stands, for example, if the driving mode of the vehicle 1 is the autonomous driving mode and the autonomous driving disabled state is expected to be reached after a predetermined time. In other words, the condition for demand of the hands on demand stands when the driver of the vehicle 1 must operate the steering wheel (that is, an operating part). If it is determined that the condition for demand of the hands on demand does not stand, the control routine is ended. On the other hand, if at step S11 it is determined that the condition for demand of the hands on demand stands, the control routine proceeds to step S12.

At step S12, the image X1 expressing the hands on demand is shown on the display 15. Further, at this time, a sound providing notification of the hands on demand may be emitted.

Next, at step S13, it is determined if a predetermined first time t1 (for example, 1 to 2 seconds) has elapsed from when the image X1 expressing the hands on demand started to be shown on the display 15 at step S12. If it is determined that the first time t1 has not elapsed, the control routine is ended. On the other hand, if at step S13 it is determined that the first time t1 has elapsed, the control routine proceeds to step S14.

At step S14, it is determined if the driver has gripped the steering wheel 17. Whether the steering wheel 17 has been gripped, for example, is detected by the touch sensor 18. If at step S17 it is not detected that the driver has gripped the steering wheel 17, the control routine proceeds to step S15.

At step S15, the display 15 shows a moving display element X2 as moving, and the first embedded light 16a is turned on so that the light part X3 appears to move. Note that, in the present embodiment, if the condition for demand of step S11 stands and it is determined that the first time t1 has elapsed at step S13 and it is not detected that the driver has gripped the steering wheel 17, at step S15 the moving display element X2 is shown and the light part X3 is turned on and these are made to move together. Therefore, these conditions together can be referred to as the "condition for moving display" for displaying the moving display element X2 and turning on the light part X3 and moving the same.

Next, at step S16, it is determined if a predetermined second time t2 has elapsed from when the image X1 expressing the hands on demand started to be shown on the display 15 at step S12. The second time t2 is longer than the above-mentioned first time t1, for example, is 4 to 5 seconds. If it is determined that the second time t2 has not elapsed, the control routine is ended. On the other hand, if at step S16 it is determined that the second time t2 has elapsed, the control routine proceeds to step S17. At step S17, for example, a large volume warning sound prompting the driver to urgently grip the steering wheel 17 is emitted, and the control routine is ended.

On the other hand, if at step S14 it is detected that the driver has gripped the steering wheel, the control routine proceeds to step S18. At step S18, the driving mode of the vehicle 1 is switched from the autonomous driving mode to the manual driving mode, and the control routine is ended.

Advantageous Effects and Modifications

In the display device of the present embodiment, the hands on demand and the light switching demand are not only shown on the display 15 as the image X1 and moving display element X2, but also are shown as the light part X3 moving at the embedded light 16. In this way, at the outside of the display 15, the light moves associated with the image on the display 15, whereby the driver can intuitively understand the information shown on the display 15.

In particular, in the present embodiment, the light part X3 turned on in the embedded light 16 moves to near the operating part where operation by the driver is required (such as steering wheel 17 or light switch 19). By the operating part where operation is required being instructed by the light moving from the display 15 in this way, even if the display 15 is far away from the driver, the driver can more intuitively recognize the operating part which has to be operated.

Note that, in the present embodiment, as the operating part which the driver has to operate, the steering wheel 17 and the light switch 19 are explained as examples. However, even when the operating part which the driver has to operate is another operating part other than these, the above-mentioned such notification control can be performed.

Second Embodiment

Next, referring to FIGS. 9 to 11, a display device according to a second embodiment will be explained. The configuration and control of the display device according to the second embodiment are basically similar to the configuration and control of the display device in the first embodiment. Therefore, below, the parts different from the display device according to the first embodiment will be focused on in the explanation.

Figure 9:
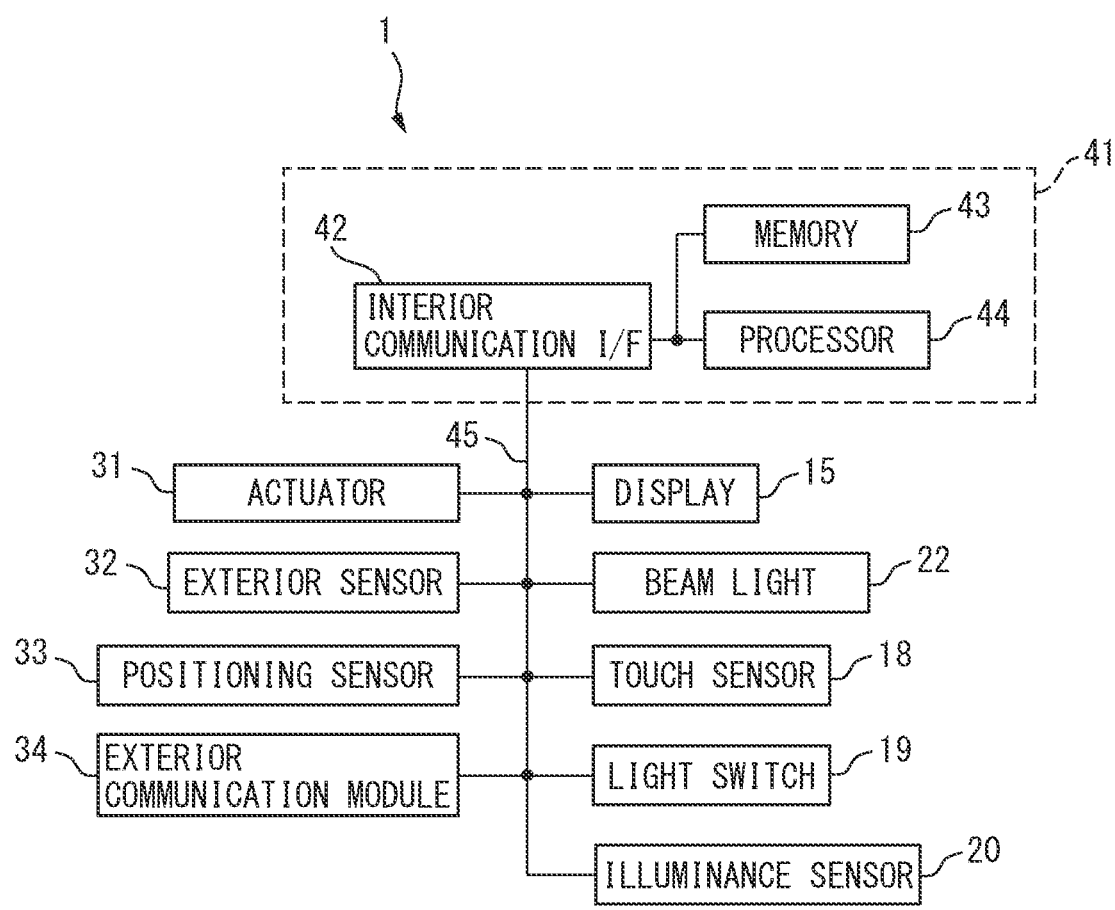
FIG. 9 is a view, similar to FIG. 2, schematically showing a configuration of a vehicle according to a second embodiment.

FIG. 9 is a view, similar to FIG. 2, schematically showing the configuration of the vehicle 1 according to the second embodiment. As will be understood from FIG. 9, in the present embodiment, the vehicle 1 is not provided with embedded lights. Instead, it is provided with a beam light 22. The beam light 22 is connected through the internal network 45 to the internal communication interface 42 of the ECU 41, and operates in accordance with a drive signal from the ECU 41. The beam light 22 forms part of the display device of the vehicle 1.

Figure 10:
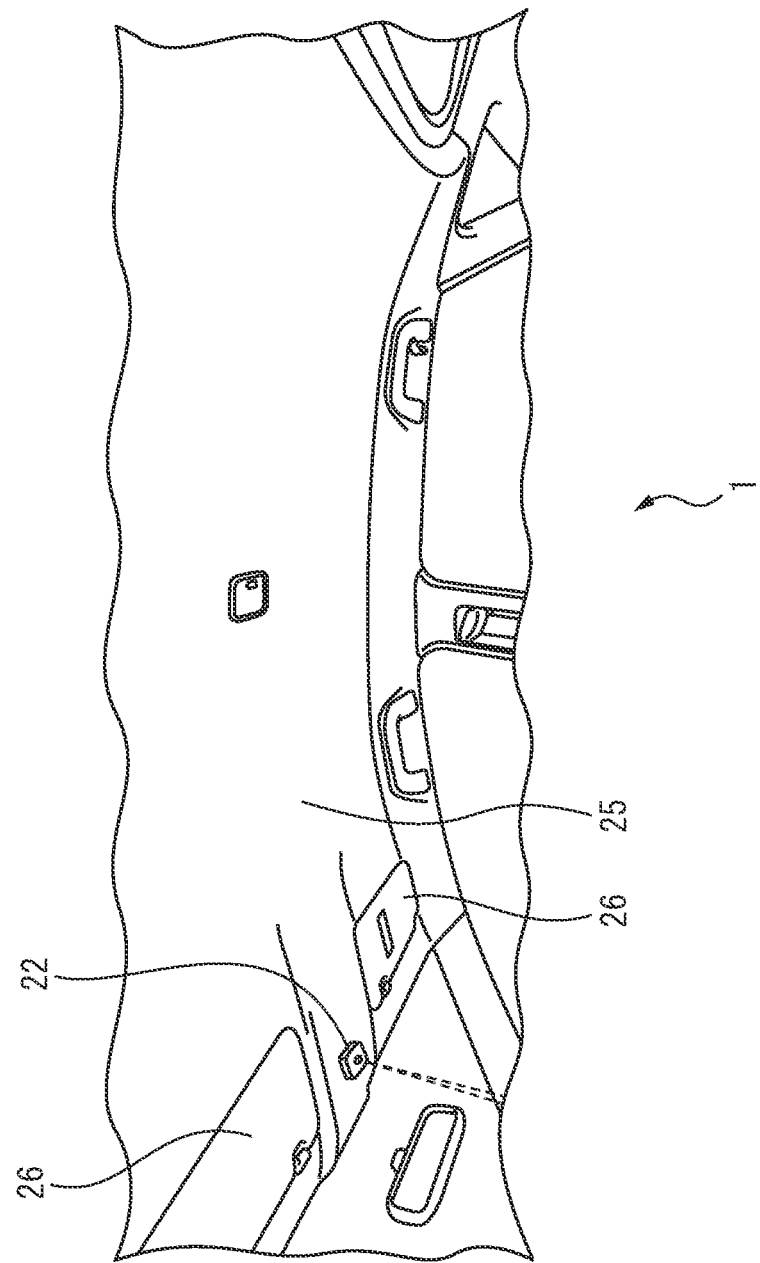
FIG. 10 is a view schematically showing part of a ceiling of a vehicle.

FIG. 10 is a view schematically showing part of the ceiling of the vehicle 1. As shown in FIG. 10, the beam light 22 is provided at the ceiling 25 of the vehicle 1. In the present embodiment, the beam light 22 is arranged at the center of the ceiling 25 in the vehicle width direction and the front side of the vehicle 1. In particular, in the example shown in FIG. 10, it is arranged between left and right sun visors 26 of the vehicle 1.

Note that, in the present embodiment, only a single beam light 22 is provided at the ceiling 25. However, the beam light 22 may also be provided at a location other than the ceiling 25, for example, a pillar or the center console. Further, a plurality of the beam lights 22 may also be provided.

The beam light 22 is one example of an interior lighting device lighting up the inside surface of the compartment of the vehicle 1 at the outside of the display 15. In the present embodiment, the beam light 22 functions as a light beaming device beaming light at the inside surface of the passenger compartment of the vehicle 1 to light up the inside surface. In particular, in the present embodiment, the beam light 22 emits a beam of laser light on the surface of the instrument panel 11 to partially light up the surface of the instrument panel 11.

Figure 11:
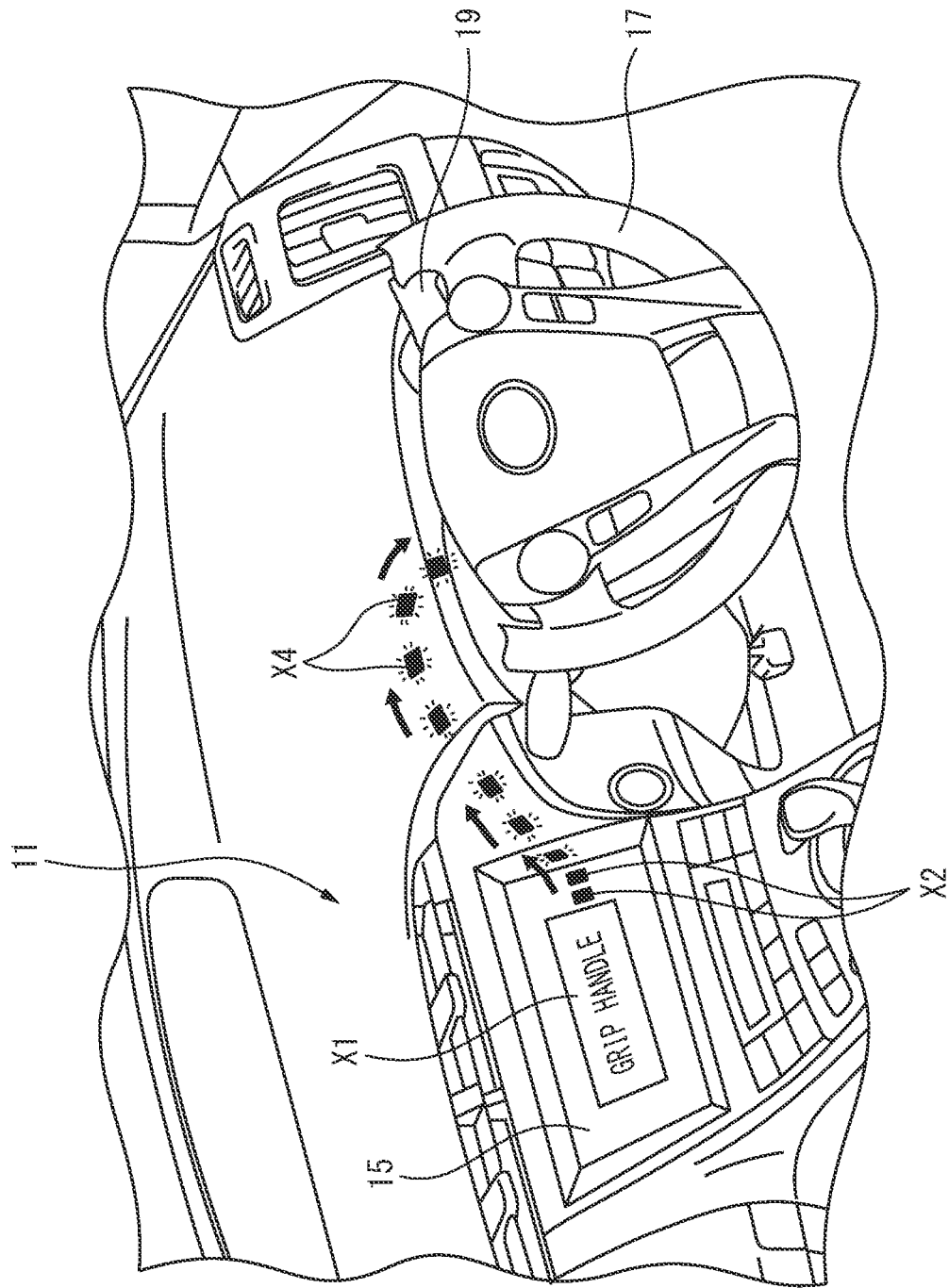
FIG. 11 is a view, similar to FIG. 3, schematically showing an area around a driver's seat of a vehicle.

FIG. 11 is a view schematically showing the area around the driver's seat of the vehicle 1 when notification control providing notification of a hands on demand is performed. In the present embodiment as well, if the autonomous driving disabled state is reached when the vehicle 1 is driven by the autonomous driving mode, the display 15 shows an image X1 expressing a hands on demand and a moving display element X2 moving toward the outer circumference of the display 15. Further, if a moving display element X2 reaches the outer circumference of the display 15 and disappears, along with this, light is beamed by the beam light 22 on the instrument panel 11 at a part around the display 15. At this time, the light part X4 on which a beam of laser light emitted from the beam light 22 hits, is positioned around the display 15 adjoining the position where the moving display element X2 disappears.

The beam light 22 emits a beam of laser light so that the light part X4 on which the beam of laser light hits moves toward the steering wheel 17 in the same way as the embedded light 16 in the first embodiment. In addition, the beam light 22 emits a beam of laser light so that the light part X4 disappears when reaching the vicinity of the steering wheel 17. Therefore, the light part X4 on which the beam of laser light hits, moves toward the steering wheel 17 at a speed of movement equivalent to the speed of movement of the moving display element X2, in the same way as the light part X3 formed by the embedded light 16 emitting light in the first embodiment. As a result, it appears as if the moving display element X2 shown on the display 15 continuously moves to the light part X4 at which the beam light 22 emits a beam of laser light.

In the present embodiment, instead of the embedded light 16, the beam light 22 is used. If using the beam light, there is no need to embed a light in the instrument panel 11, etc. Accordingly, the manufacturing cost is reduced.

Third Embodiment

Next, referring to FIGS. 12 to 14, a display device according to a third embodiment will be explained. The configuration and control of the display device according to the third embodiment are basically similar to the configuration and control of the display device in the first embodiment and the second embodiment. Therefore, below, the parts different from the display device according to the first embodiment and the second embodiment will be focused on in the explanation.

Configuration of Vehicle

Figure 12:
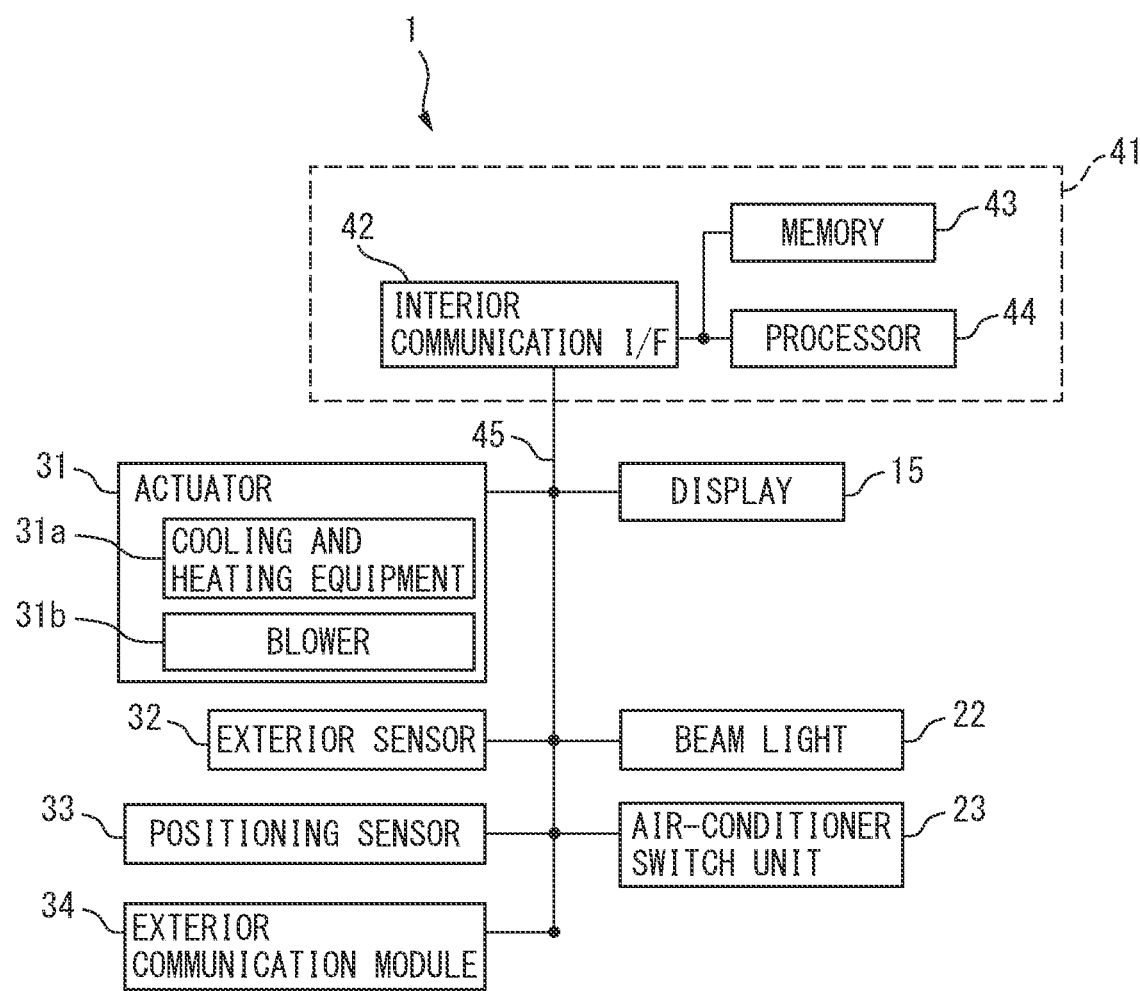
FIG. 12 is a view, similar to FIG. 2, schematically showing a configuration of a vehicle according to a third embodiment.

FIG. 12 is a view, similar to FIG. 2, schematically showing the configuration of the vehicle 1 according to the third embodiment. As will be understood from FIG. 12, the vehicle 1 is provided with beam lights 22. In the present embodiment, a beam light 22 is provided at not only the ceiling 25, but also at the center console 27 such as shown in FIG. 13.

As will be understood from FIG. 12, in the present embodiment, the vehicle 1 is provided with an air-conditioner switch unit 23 controlling the operation of an air-conditioner (not shown). Further, in the present embodiment, the actuators 31 include an actuator used for an air-conditioner.

Specifically, the actuators 31 include cooling and heating equipment 31a cooling and heating air supplied to the passenger compartment of the vehicle 1, and a blower 31b blowing into the passenger compartment the air which is cooled or heated by the cooling and heating equipment 31a. The cooling and heating equipment 31a, for example, includes a compressor used in the refrigeration cycle. Further, if an internal combustion engine is used as power of the vehicle 1, the cooling and heating equipment 31a, for example, includes a switching valve switching whether to supply part of the cooling water of the internal combustion engine to piping for air-conditioner.

The air-conditioner switch unit 23 is provided with a plurality of switches for controlling the air-conditioner. The air-conditioner switch unit 23 is, for example, configured so as to enable the operating mode of the air-conditioner to be selected from the auto mode, cooling mode, heating mode, and dehumidifying mode. When the operating mode of the air-conditioner is the cooling mode, the air is cooled by the cooling and heating equipment 31a and the cooled air is blown into the passenger compartment by the blower 31b. When the operating mode of the air-conditioner is the heating mode, the air is heated by the cooling and heating equipment 31a and the heated air is blown by the blower 31b into the passenger compartment. When the operating mode of the air-conditioner is in the dehumidifying mode, the air is cooled, then heated by the cooling and heating equipment 31a, then the air is blown into the passenger compartment by the blower 31b.

On the other hand, when the air-conditioner switch unit 23 is set to the auto mode, the operating state of the air-conditioner is set by the ECU 41. For example, when the temperature inside the passenger compartment of the vehicle 1 is higher than the set temperature set by the air-conditioner switch unit 23, the air is cooled by the cooling and heating equipment 31a and the cooled air is blown by the blower 31b into the passenger compartment. That is, in this case, cooling is performed by the air-conditioner. Similarly, when the temperature inside the passenger compartment of the vehicle 1 is lower than the set temperature set by the air-conditioner switch unit 23, the air is heated by the cooling and heating equipment 31a and the heated air is blown by the blower 31b into the passenger compartment. That is, in this case, heating is performed by the air-conditioner.

Operation of Display Device

When, in this way, the air-conditioner switch unit 23 is set to the auto mode, the operating state of the air-conditioner is automatically controlled by the ECU 41. Therefore, in the present embodiment, when the operating state of the air-conditioner has changed, for example, when cooling or heating is automatically started by the air-conditioner, notification control for notifying an occupant of the start of cooling or heating is performed.

Figure 13:
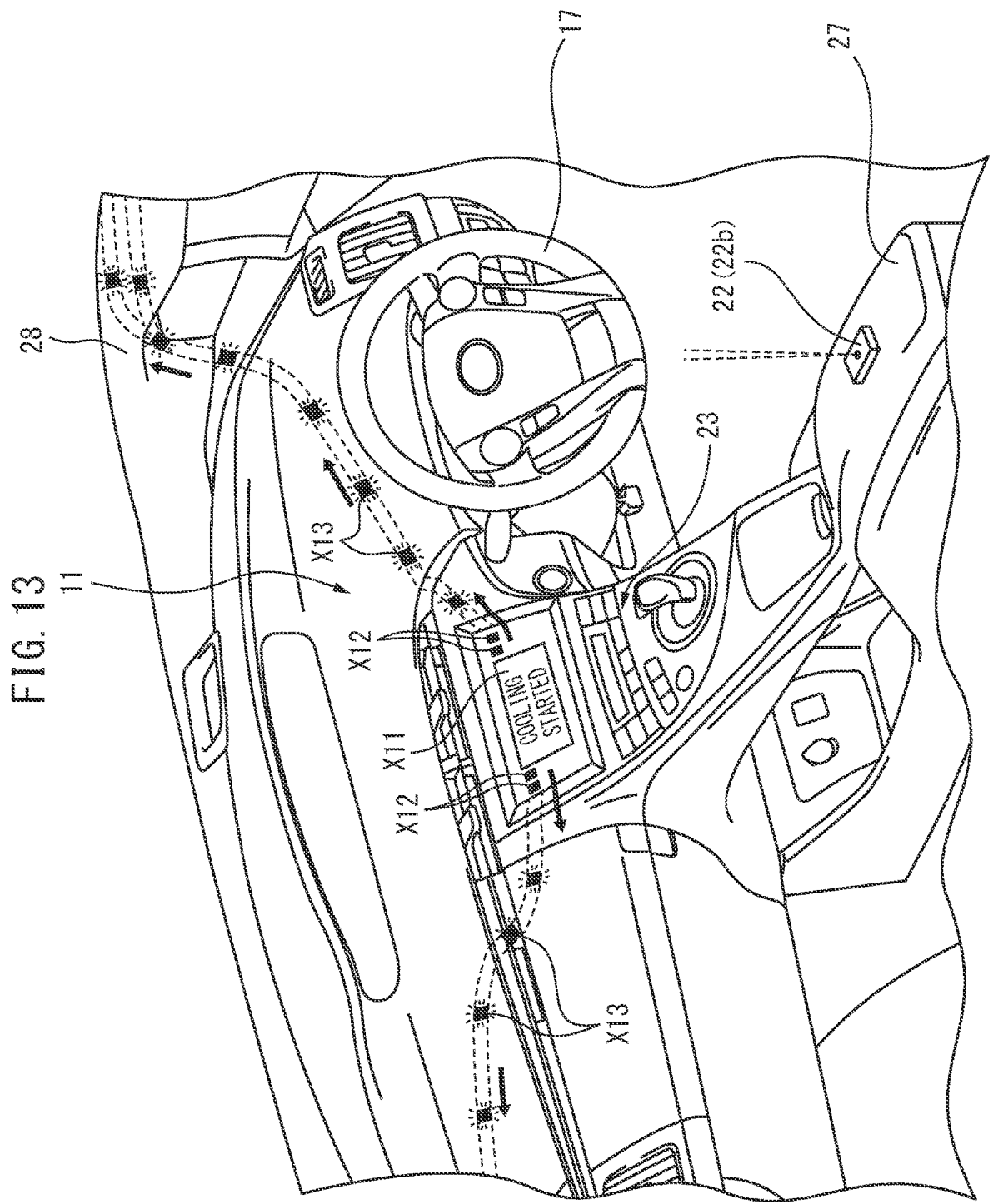
FIG. 13 is a view, similar to FIG. 3, schematically showing an area around a driver's seat of a vehicle.

FIG. 13 is a view schematically showing the area around the driver's seat of the vehicle 1 when notification control for notifying an occupant of the start of cooling is performed. Further, FIG. 14 is a view schematically showing part of the ceiling of the vehicle 1 when notification control for notifying an occupant of the start of cooling is performed.

As shown in FIG. 13, when the notification control is started, an image X11 showing the fact that cooling has been started is shown on the display 15. In the example shown in FIG. 13, as the image X11 showing the fact that cooling has been started, the text "cooling started" is shown at the center of the display 15. Note that, the image showing the start of cooling or heating may, for example, be a graphic or other image besides text showing the state of air being blown into the passenger compartment of the vehicle.

After that, in the present embodiment, in the notification control, the display 15 shows a blue moving display element X12 moving from the image X11 showing the state of start of cooling toward the outer circumference of the display 15. Further, if the moving display element X12 disappears after reaching the outer circumference of the display 15, along with this, at part of the area around the display 15, a beam light 22 emits blue colored light at the instrument panel 11. At this time, the blue colored light part X13, at which the beam light 22 emits a beam of laser light, is the area around the display 15 positioned adjoining the position where the moving display element X12 disappears.

Figure 14:
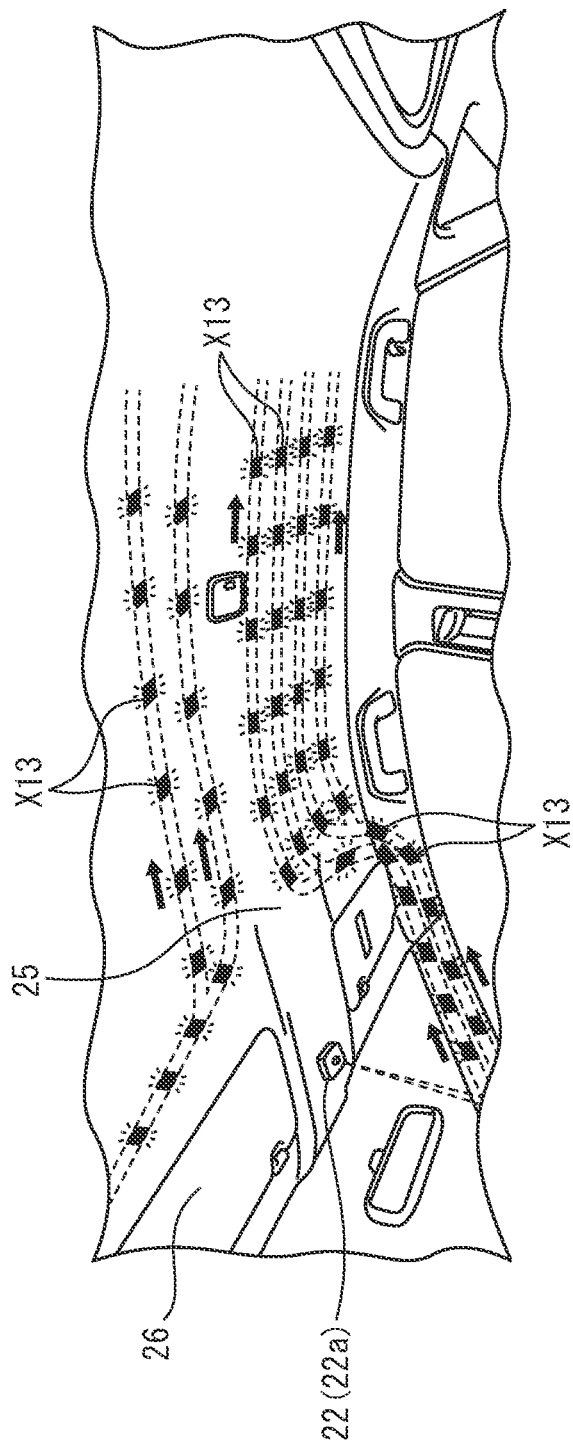
FIG. 14 is a view schematically showing part of a ceiling of a vehicle.

The light part X13 formed by a beam light 22 emitting a beam of laser light, as shown in FIGS. 13 and 14, is formed at the instrument panel 11, a front pillar 28, and ceiling 25. Note that, in FIGS. 13 and 14, the broken lines show the route of movement when the light part X13 is moving. Therefore, the light part X13 moves along the route of movement shown by the broken line in the direction shown by the arrow marks in FIGS. 13 and 14.

Specifically, in the example shown in FIGS. 13 and 14, the light part X13 first moves from the area around the display 15 over the instrument panel 11 toward a front pillar 28. The light part X13 on the instrument panel 11 is formed by the first beam light 22a provided at the ceiling 25.

The light part X13 is divided into two when reaching a front pillar 28, and each of the divided parts moves along the front pillar 28 toward the ceiling 25. The light part X13 on the front pillar is formed by the first beam light 22a provided at the ceiling 25 and the second beam light 22b provided at the center console 27.

The light part X13 moving on each front pillar 28 is divided from two to four when reaching the ceiling 25, and moves from the front to the back of the vehicle 1. That is, in the present embodiment, the light part X13 moves over a plurality of different routes in the front-back direction of the vehicle 1. The light part X13 on the ceiling 25 is formed by the second beam light 22b provided on the center console 27.

Note that, FIGS. 13 and 14 show the case where notification control notifying an occupant of the start of cooling. In this case, the moving display element X12 and the light part X13 are blue colored. On the other hand, if notification control notifying an occupant of the start of heating is performed, the moving display element X12 and the light part X13 are different colors from blue, for example, red. In this way, in the present embodiment, the moving display element X12 and the light part X13 change color in accordance with the operating state of the air-conditioner, whereby the type of control performed by the air-conditioner can be intuitively grasped by the occupant.

Further, in the example shown in FIGS. 13 and 14, the light part X13 which had moved over each front pillar 28 is divided into four at the ceiling 25. However, the number into which it is divided at this timing, is not necessarily four.

Further, the number into which it is divided at this timing may change according to the strength of the cooling and heating and the strength of the blowing operation of the blower 31*b*. Specifically, as the cooling or heating is stronger or as the blowing operation of the blower 31*b* is stronger, the number into which it is divided is greater. By changing the number of routes into which the route of movement of the light part X13 is divided in this way, it becomes possible for an occupant to intuitively grasp the strength of the cooling or heating or the blowing operation of the blower 31*b*.

Flow Chart

Figure 15:
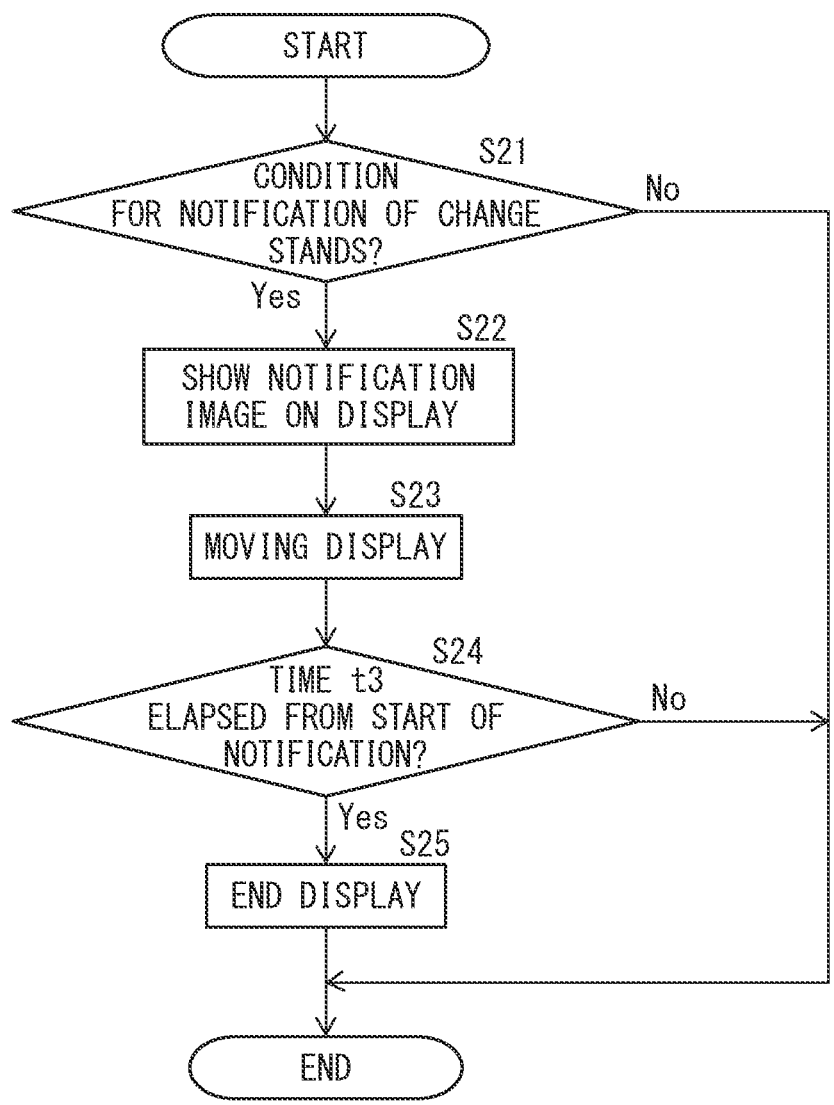
FIG. 15 is a flow chart showing a control routine of notification control for providing notification that an operating state of an air-conditioner changes.

FIG. 15 is a flow chart showing a control routine of notification control providing notification of the operating state of the air-conditioner. The control routine illustrated is performed every certain time interval.

First, at step S21, it is determined if the condition for notification for notifying a change of the operating state of the air-conditioner stands. The notification condition stands, for example, when the operating state of the air-conditioner changes in a predetermined way (for example, the start of heating, the start of cooling, changes in strength of the blower of predetermined levels or more, changes in strength of cooling or heating of predetermined levels or more, etc.) If it is determined that the condition of notification does not stand, the control routine is ended. On the other hand, if it is determined that the condition of notification stands, the control routine proceeds to step S22.

At step S22, an image X11 providing notification of a change of the operating state of the air-conditioner is shown on the display 15. Next, at step S23, the display 15 shows the moving display element X12 as if it were moving. The light part X13 formed by the beam light 22 is made to move. Note that, if at step S21 the condition for notification stands, the moving display element X12 is shown, the light part X13 are lit up, and these are moved. Therefore, the "condition for notification" at step S21 can be said to be the "condition for moving display" for showing the moving display element X12 and lighting up the light part X13 and making these move.

Next, at step S24, it is determined if a predetermined third time t3 has elapsed from when notification was started, that is, from when display of the image X11 or moving display element X12 and formation of the light part X13 were started. The third time t3 may be a certain time set in advance, or may be a time set by an occupant. If at step S24 it is determined that the third time t3 has not elapsed from the start of notification, the control routine is ended. On the other hand, if at step S24 it is determined that the third time t3 has elapsed from the start of notification, the control routine proceeds to step S25. At step S25, the display of the image X11 and the moving display element X12 and the formation of the light part X13 are ended, and the control routine is ended.

Advantageous Effects and Modification

In the display device of the present embodiment, when the operating state of the air-conditioner automatically changes, the change of the operating state is shown, as lighted parts X13, on the instrument panel 11, front pillars 28, and ceiling 25, as well as on the display 15 as the image X11. In this way, at the outside of the display 15 as well, the light moves associated with the display of the display 15 whereby the driver can more intuitively obtain a grasp of the information shown on the display 15.

Note that, in the present embodiment, the explanation was given with reference to the case of the operating state of the air-conditioner automatically changing. However, there are other cases where the state of the vehicle 1 automatically changes without direct operation of the occupants. Specifically, for example, when the light switch 19 is in the auto mode, the case of the headlights being automatically turned on or turned off may be mentioned. The notification control according to the present embodiment can also be used in such a case.

Therefore, in the present embodiment, the ECU 41 can be said, when the state of the vehicle has been automatically changed without direct operation of an occupant, to make the display 15 show a display element expressing changes of the state of the vehicle (corresponding to image X11), and to display the moving display element so as to move from the display element toward the outside of the display 15. After that, the ECU 41 can be said to make the beam lights 22 light up the inside surface of the vehicle 1 so that when the moving display element reaches the outside of display 15, so that the light part lit up by the beam lights 22 appears to successively move from the moving display element.

Above, preferred embodiments according to the present invention were explained, but the present invention is not limited to these embodiments and can be corrected and changed in various ways within the language of the claims.

The invention claimed is:

1. A display device of a vehicle comprising:
   a display provided inside of the vehicle;
   an interior lighting device lighting up an inside surface of a passenger compartment of the vehicle at an outside of the display; and
   a processor configured to function as a control device controlling the display and the interior lighting device,
   wherein the control device is configured so that when a condition for moving display stands, the display is made to show a command corresponding to an operation to be required by a driver of the vehicle, a moving display element moving from the command to an outer circumference of the display,
   and when the moving display element reaches the outer circumference of the display, the interior lighting device lights up an inside surface of a passenger compartment of the vehicle so that a light part lit by the interior lighting device appears to move successively from the moving display element
   in a manner so that the light part appears to move successively away from the command to an outside of the display toward an operating part for operating the vehicle.

2. The display device of the vehicle according to claim 1, wherein the interior lighting device includes a light emitting device embedded at the interior of the vehicle and emitting light on its own.

3. The display device of the vehicle according to claim 1, wherein the interior lighting device includes a light beam device beaming light on an inside surface at the interior of the vehicle.

4. The display device of the vehicle according to claim 1, wherein the condition for moving display stands when it is necessary to make an occupant of the vehicle to perform an operation with respect to the vehicle.

5. The display device of the vehicle according to claim 4, wherein the control device makes the display show the operation which the occupant of the vehicle has to perform, when the condition for moving display stands.

6. The display device of the vehicle according to claim 4, wherein the condition for moving display stands when it is necessary to make the driver of the vehicle to operate the operating part.

7. The display device of the vehicle according to claim 6, wherein
the operating part is a steering wheel of the vehicle,
the vehicle is configured to be able to be driven in an autonomous driving mode where the vehicle is automatically steered even without the driver operating the steering wheel and a manual driving mode where the vehicle is steered by the driver operating the steering wheel, and
the condition for moving display stands when it is necessary to make the driver to grip the steering wheel so as to switch the driving mode of the vehicle from the autonomous driving mode to the manual driving mode.

8. The display device of the vehicle according to claim 1, wherein the condition for moving display stands when a state of the vehicle automatically changes without an occupant of the vehicle performing a direct operation.

9. The display device of the vehicle according to claim 8, wherein
the control device makes the display show a display element expressing a change in state of the vehicle when the condition for moving display stands, and
the moving display element moves from the display element expressing a change toward an outside of the display.

10. The display device of the vehicle according to claim 8, wherein the interior lighting device is configured so that the light part moves in a front-back direction by a plurality of different routes.

11. The display device of the vehicle according to claim 8, wherein
the condition for moving display stands when an operating state of an air-conditioner of the vehicle changes, and
the control device is configured so that the light part lit by the interior lighting device changes color according to the operating state of the air-conditioner of the vehicle.

12. The display device of the vehicle according to claim 1, wherein the command is a text command.

* * * * *